Patented Jan. 16, 1940

2,187,572

UNITED STATES PATENT OFFICE 2,187,572

METHOD OF CONCENTRATING CITRUS FRUIT JUICES

Gotthold Harry Meinzer, Glendale, Calif., assignor to California Consumers Corporation, Los Angeles, Calif., a corporation of California No Drawing. Application May 17, 1937, Serial No. 143,123

2 Claims. (Cl. 99—155)

The object of my invention is to provide a method for concentrating the juices of the various citrus fruits without any application of heat thereto and without any detrimental effect on the flavor or aroma of the juice.

It is old in the art to concentrate fruit juices by submitting the entire juice to a partial freezing, the concentrated solution thus separated being drained or centrifuged away from the ice crystals. When applied to juices substantially free from solid matters, such as those of grapes and the various berries, this method works very well, it being possible to remove from one-third to two-thirds of the water content in the form of ice containing no useful constituent of the original juice.

This desirable result, however, is obtained only when the coloring and flavoring matters of the juice are in solution. It has been found by experience that when this method is applied to the juices of the citrus fruits only a moderate degree of concentration can be effected, hardly enough to be of any commercial value, and that there is a heavy loss of the characteristic coloring and flavoring constitutents which distinguish the juice from a mere solution of acids and sugars.

I have discovered that this loss is due to entrainment of these coloring and flavoring constituents in the ice, and that this loss is unavoidable (other than by the use of the method herein disclosed) by reason of the following facts.

The components which impart color and flavor to a citrus fruit juice are resinous or oily bodies (possibly both) which are attached to the inner wall of the vesicles in which the juice is originally contained. These bodies, which will be referred to hereinafter as "chromatophores", occur in the form of microscopic particles which are firmly attached to the vesicle wall and cannot be detached by any presently known mechanical method.

When the juice is extracted from the fruit by crushing or reaming, the vesicle walls are ruptured and each bears its quota of the attached chromatophore particles. At the same time the juice is burdened with a greater or less proportion of comminuted cellulosic material derived from the rag and albedo of the fruit. The greater part of this cellulosic material may be removed from the juice by straining, though some of it is always left behind because of the difficulty experienced in passing the juice through fine screens. That portion of the cellulosic material resulting from the breaking down of the vesicle walls cannot be removed without at the same time depriving the juice of color and flavor, because of the firm attachment of the chromatophore particles to these cellulosic fragments.

When the most carefully strained juice, freed from as much of the rag and albedo as can be removed without also removing a material part of the chromatophores, is submitted to a freezing step, the ice crystals substantially exclude the water soluble constituents of the juice (notably the acids and sugars) leaving them in the form of a concentrated solution, but they do not wholly exclude the solids to which the chromatophores are attached. When the crystals are allowed to grow slowly, a large proportion of the total solids and of the attached chromatophore particles are entrained by the mass of crystals. When the freezing is conducted rapidly and with agitation, so as to form small crystals, the degree of occlusion and entrainment is somewhat reduced. Under the most favorable conditions, however the proportion of the total chromatophores carried away by the ice crystals is highly material, and the reconstituted juice resulting from the addition of a quantity of water equal to that removed as ice is flat, lacking in the flavor and aroma of the original juice.

The extent of this loss is indicated by the results of the following experiments. Strained samples of Valencia and navel orange juice respectively were rapidly frozen with agitation to produce the smallest possible ice crystals. The uncongealed liquid was separated from the crystals by centrifuging in a wire basket. The proportion of acids and sugars in this liquid indicated a concentration to about one-half the original volume. The liquid was then again frozen and the crystals separated as before. The concentration of the liquid was then about one-fourth that of the original liquid. The ice crystals were separately melted and the proportion of chromatophores determined in each of the six samples, i. e., the two aqueous fractions resulting from the melting of the ice and the one concentrate from each of the two juices. The quantities of chromatophores thus disclosed were distributed as follows:

|  | Valencia juice | Navel juice |
| --- | --- | --- |
| In concentrated juice | 8.09 grams | 7.81 grams |
| In first crop ice crystals | 5.37 grams | 6.42 grams |
| In second crop ice crystals | 2.31 grams | 2.05 grams |
| Total loss to ice | 7.68= 51.8% | 8.47= 52.0% |
| Recovered in concentrate | 8.09= 48.2% | 7.81= 48.0% |
|  | 15.77=100.0% | 16.28=100.0% |

I have discovered that this loss of chromatophores may wholly be avoided and that a materially higher degree of concentration may be attained by removing the chromatophores and all accompanying solids from the juice prior to the freezing step, these solids and chromatophores being returned to the concentrated solution of sugars and acids separated from the ice crystals. In more detail I proceed as follows:

The rough juice as produced, for example, by reaming, is first strained in the conventional manner to remove as much of the coarser cellulosic substance as may be desired, the limit to this straining effect being that at which the pulp layer on the strainer begins to hold up the minute particles of vesicle wall to which the chromatophores are attached.

The strained juice is then subjected to a centrifuging operation at high speed until it is substantially deprived of flavor and substantially decolorized, the latter reservation being due to the fact that some citrus juices appear to contain dissolved coloring matter which cannot be removed by centrifuging. This soluble coloring matter is sometimes sufficient to impart a yellowish color to the centrifuged juice.

The chromatophores and accompanying cellulosic material collecting in the bowl of the centrifuge may ordinarily be reduced to a volume ranging from 2% to 5% that of the original strained juice, the bulk varying with the effectiveness both of the centrifuging and of the preliminary straining step. This composite appears as a buttery mass which is readily removed from the centrifuge bowl. It has a strongly developed property of imparting to citric acid solutions the flavor and aroma of the fresh juice and a color which varies from lemon yellow to deep orange, following the depth of color of the original juice. It disperses with some difficulty in pure water but is readily and completely dispersed by simple stirring in water containing citric acid in solution.

This chromatophore fraction is set aside until needed for readmixture, as will be described, and may be preserved indefinitely under refrigeration without any change in flavor or aroma, or at higher temperatures when mixed with syrups. If stored for any considerable length of time, it should be protected from air and light to ensure maintenance of the purity and freshness of the flavor.

The colorless or pale liquid resulting from the centrifuging step is now submitted to partial congelation by chilling in any convenient manner. Contrary to the practice in freezing a whole juice as in the prior art, it is not necessary to form minute crystals, inasmuch as there are no solids to be entrained. The highest degree of concentration is favored by the production of rather large ice crystals, from which the liquid concentrate in a syrupy consistency is more readily separated. When the residual liquid has become concentrated to the desired degree it is drained away from the ice crystals, preferably by centrifuging at low speeds in wire baskets. The ice crystals may now be washed with small quantities of ice water to remove adhering concentrate. To produce the highest degree of concentration the washings should be added to the next batch of juice to be frozen rather than added to the concentrate. By proceeding in this manner it is possible to reduce the volume of the acid + sugar concentrate to from 15% to 20% that of the strained juice originally taken.

This concentrate is now added to the chromatophores and accompanying pulp separated in the high speed centrifuging, the buttery mass being readily miscible with and dispersible in the concentrate by simple stirring. Ordinarily the concentrate will be admixed with the chromatophore mass in the proportions in which they are realized from any given strained juice, through they may be mixed in other proportions if desired.

When mixed in the original proportions the combined concentrate will have a volume ranging from 20% to 25% that of the original strained juice. The high percentage of sugar in this combined concentrate tends to prevent fermentation. For use it is merely rediluted with more or less the quantity of water removed in the freezing step. As the concentrate has not been subjected to heat at any stage of the operation, the rediluted product will be found to have the color, taste, flavor, and aroma of the fresh juice, entirely unimpaired and undistinguishable from those of the fresh juice taken for the operation. The vitamins and other valued constituents of the fresh juice are present in their original form in the concentrate and in the beverage formed by its redilution.

I claim as my invention:

1. The method of concentrating a citrus fruit juice which comprises: straining said juice and thereby removing coarse pulp therefrom; separating from said juice by centrifugal force a fraction containing the chromatophores; partially freezing the aqueous liquid remaining from said separation; rejecting the ice crystals, and recombining the concentrated liquid with said chromatophore fraction.

2. The method of concentrating a citrus fruit juice which comprises: strongly centrifuging said juice and thereby substantially separating the solid constituents together with the coloring and flavoring constituents of said juice; partially freezing the aqueous liquid remaining from said separation; rejecting the ice crystals, and recombining the concentrated liquid with said separated constituents.

GOTTHOLD HARRY MEINZER.